United States Patent
Li et al.

(10) Patent No.: US 9,754,539 B2
(45) Date of Patent: Sep. 5, 2017

(54) METHOD AND APPARATUS FOR SETTING BRIGHTNESS OF A DISPLAY SCREEN

(71) Applicant: Xiaomi Inc., Beijing (CN)

(72) Inventors: Guosheng Li, Beijing (CN); Anyu Liu, Beijing (CN); Shanrong Liu, Beijing (CN)

(73) Assignee: Xiaomi Inc., Beijing (CN)

(*) Notice: Subject to any disclaimer, the term of this patent is extended or adjusted under 35 U.S.C. 154(b) by 0 days.

(21) Appl. No.: 15/346,088

(22) Filed: Nov. 8, 2016

(65) Prior Publication Data

US 2017/0053604 A1    Feb. 23, 2017

Related U.S. Application Data

(63) Continuation of application No. PCT/CN2015/093408, filed on Oct. 30, 2015.

(30) Foreign Application Priority Data

Jan. 8, 2015    (CN) .......................... 2015 1 0010144
Feb. 11, 2015    (CN) .......................... 2015 1 0072593

(51) Int. Cl.
   *H05B 37/02*    (2006.01)
   *G09G 3/34*    (2006.01)
   *H04M 1/725*    (2006.01)

(52) U.S. Cl.
   CPC .......... *G09G 3/3406* (2013.01); *H04M 1/725* (2013.01); *H05B 37/0218* (2013.01);
   (Continued)

(58) Field of Classification Search
   None
   See application file for complete search history.

(56) References Cited

U.S. PATENT DOCUMENTS

2013/0021308 A1*    1/2013    Ge .................. G09G 3/3406
                                                              345/207
2013/0328842 A1*    12/2013    Barnhoefer .......... G09G 3/3406
                                                              345/207
(Continued)

FOREIGN PATENT DOCUMENTS

JP    2005-181602 A    7/2005
JP    2012-095286 A    5/2012
JP    2014-064222 A    4/2014

OTHER PUBLICATIONS

Office Action dated Jun. 2, 2017 for Japanese Application No. 2016-524079, 8 pages.

*Primary Examiner* — Jany Richardson
(74) *Attorney, Agent, or Firm* — Brinks, Gilson & Lione

(57) ABSTRACT

Methods and an apparatus for setting brightness of a display screen of an electronic device based on ambient light brightness. The method includes acquiring by a light sensor on the electronic device a measured brightness of ambient light having an actual ambient brightness at where the electronic device is located; detecting whether the light sensor faces away from a light source in the environment; when it is detected that the light sensor does not face away from the light source, determining a reference backlight brightness level according to a backlight brightness level-setting function comprising a correspondence between actual ambient brightness levels and backlight brightness levels, by using the measured brightness as actual ambient brightness; and setting an actual backlight brightness of the backlighted display screen to the reference backlight brightness level; and when it is detected that the light sensor faces away from the light source, setting the actual backlight brightness of the backlighted display screen at a level different from the reference backlight brightness level.

18 Claims, 9 Drawing Sheets

(52) U.S. Cl.
CPC . *H05B 37/0227* (2013.01); *G09G 2320/0626* (2013.01); *G09G 2360/144* (2013.01); *G09G 2360/145* (2013.01)

(56) References Cited

U.S. PATENT DOCUMENTS

| 2016/0005362 A1* | 1/2016 | Chen | G09G 3/3406 |
| | | | 345/690 |
| 2016/0203749 A1* | 7/2016 | Steyskal | G09G 3/3406 |
| | | | 345/207 |

* cited by examiner

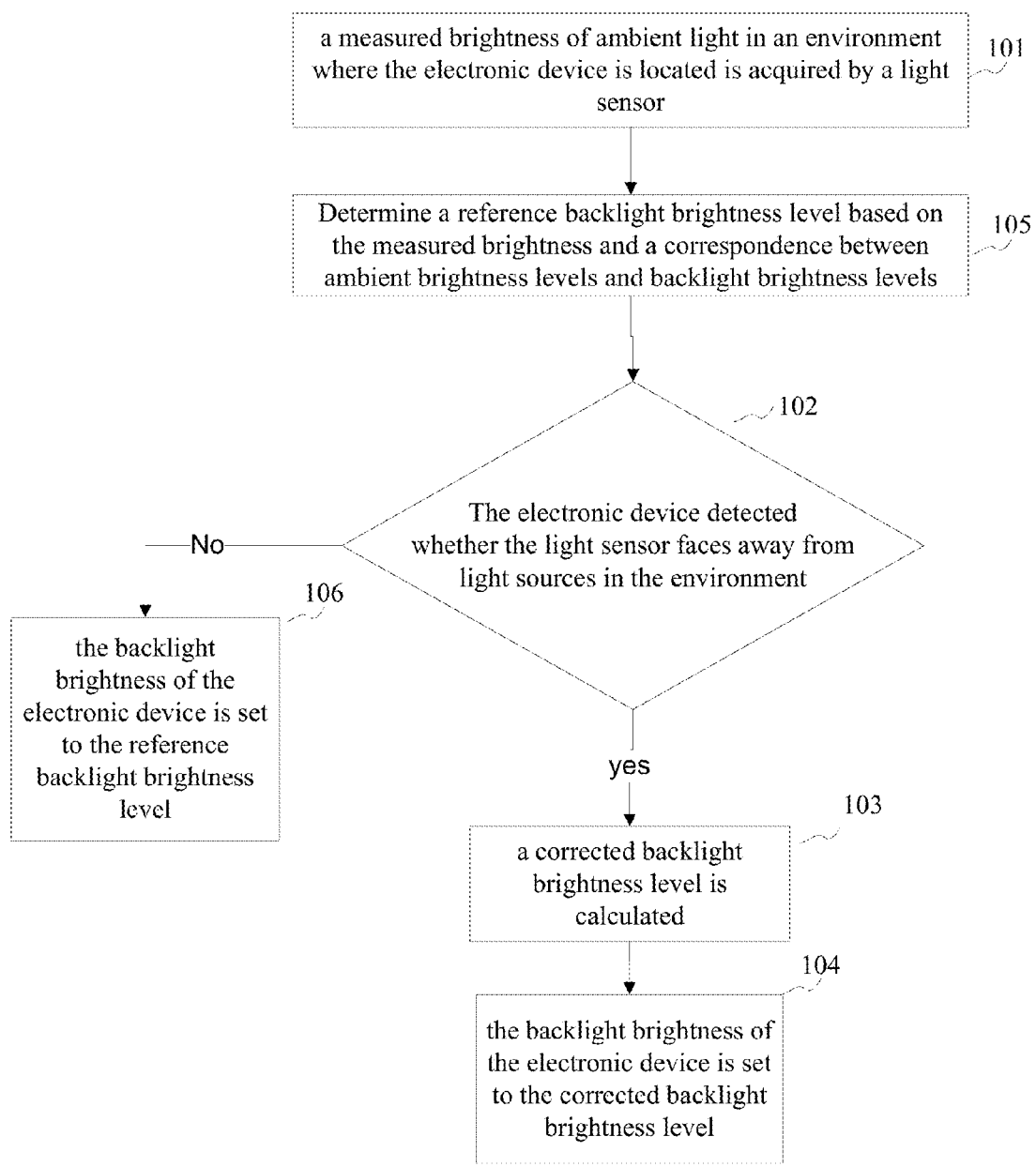

Fig. 2E
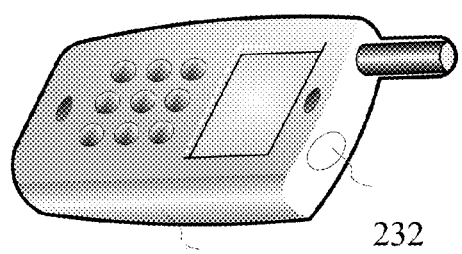
231   232
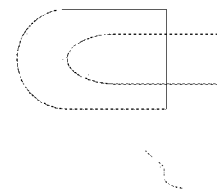
230
234
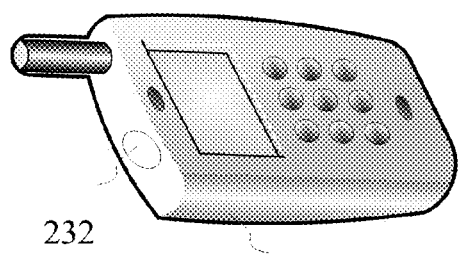
232   231
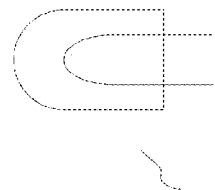
230
236

METHOD AND APPARATUS FOR SETTING BRIGHTNESS OF A DISPLAY SCREEN

CROSS-REFERENCE TO RELATED APPLICATIONS

This application is a continuation of International Application No. PCT/CN2015/093408, filed on Oct. 30, 2015, which is based on and claims priority to Chinese Patent Application No. 201510072593.7, filed on Feb. 11, 2015, and Chinese Patent Application No. 201510010144.X, filed on Jan. 8,2015, wherein the entirety of each of the aforementioned applications is incorporated herein by reference.

TECHNICAL FIELD

The present disclosure generally relates to the field of display technology, and more particularly, to methods and apparatus for setting a brightness of a display screen.

BACKGROUND

A display screen of an electronic device, e.g., a liquid crystal display (LCD) panel, may adjust backlight level automatically according to ambient lighting conditions. Such automatic backlight adjustment may provide a display screen brightness that is adapted to the ambient light, reducing eye fatigue and providing improved viewing comfort for a user.

A light sensor may be mounted on the electronic device for measuring the ambient lighting condition. Ambient light enters into the light sensor via an opening on the electronic device. The accuracy of the measurement depends on the geometrical relationship between the ambient light sources, the opening for the light sensor, and the orientation of the device and light sensor.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure provides methods and an apparatus for setting a brightness of a display screen based on a more accurate determination of ambient light level. In one embodiment, a method for setting brightness of a backlighted display screen of an electronic device is disclosed, comprising: acquiring by a light sensor on the electronic device a measured brightness of ambient light having an actual ambient brightness at where the electronic device is located; detecting whether the light sensor faces away from a light source in the environment; when it is detected that the light sensor does not face away from the light source, determining a reference backlight brightness level according to a backlight brightness level-setting function comprising a correspondence between actual ambient brightness levels and backlight brightness levels, by using the measured brightness as actual ambient brightness; and setting an actual backlight brightness of the backlighted display screen to the reference backlight brightness level; and when it is detected that the light sensor faces away from the light source, setting the actual backlight brightness of the backlighted display screen at a level different from the reference backlight brightness level.

In another embodiment, an electronic device is disclosed, comprising: a backlighted display screen; a light sensor installed on a surface on the electronic device; and a processor configured to: acquire by the light sensor a measured brightness of ambient light having an actual ambient brightness at where the electronic device is located; detect whether the light sensor faces away from a light source in the environment; when it is detected that the light sensor does not face away from the light source, determine a reference backlight brightness level according to a backlight brightness level-setting function comprising a correspondence between actual ambient brightness levels and backlight brightness levels, by using the measured brightness as actual ambient brightness; and set an actual backlight brightness of the backlighted display screen to the reference backlight brightness level; and when it is detected that the light sensor faces away from the light source, set the actual backlight brightness of the backlighted display screen at a level different from the reference backlight brightness level.

In another embodiment, a non-transitory computer-readable storage medium having stored therein instructions is disclosed. The instructions, when executed by a processor of an electronic device having a backlighted display screen, causes the electronic device to acquire by a light sensor on the electronic device a measured brightness of ambient light having an actual ambient brightness at where the electronic device is located; detect whether the light sensor faces away from a light source in the environment; when it is detected that the light sensor does not face away from the light source, determine a reference backlight brightness level according to a backlight brightness level-setting function comprising a correspondence between actual ambient brightness levels and backlight brightness levels, by using the measured brightness as actual ambient brightness; and set an actual backlight brightness of the backlighted display screen to the reference backlight brightness level; and when it is detected that the light sensor faces away from the light source, set the actual backlight brightness of the backlighted display screen at a level different from the reference backlight brightness level.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 1 is a flow chart showing a method for setting a brightness of a display screen according to an example embodiment of the present disclosure;

FIG. 2E illustrates an application scenario according to an example embodiment of the present disclosure;

DETAILED DESCRIPTION

Figure 2A:
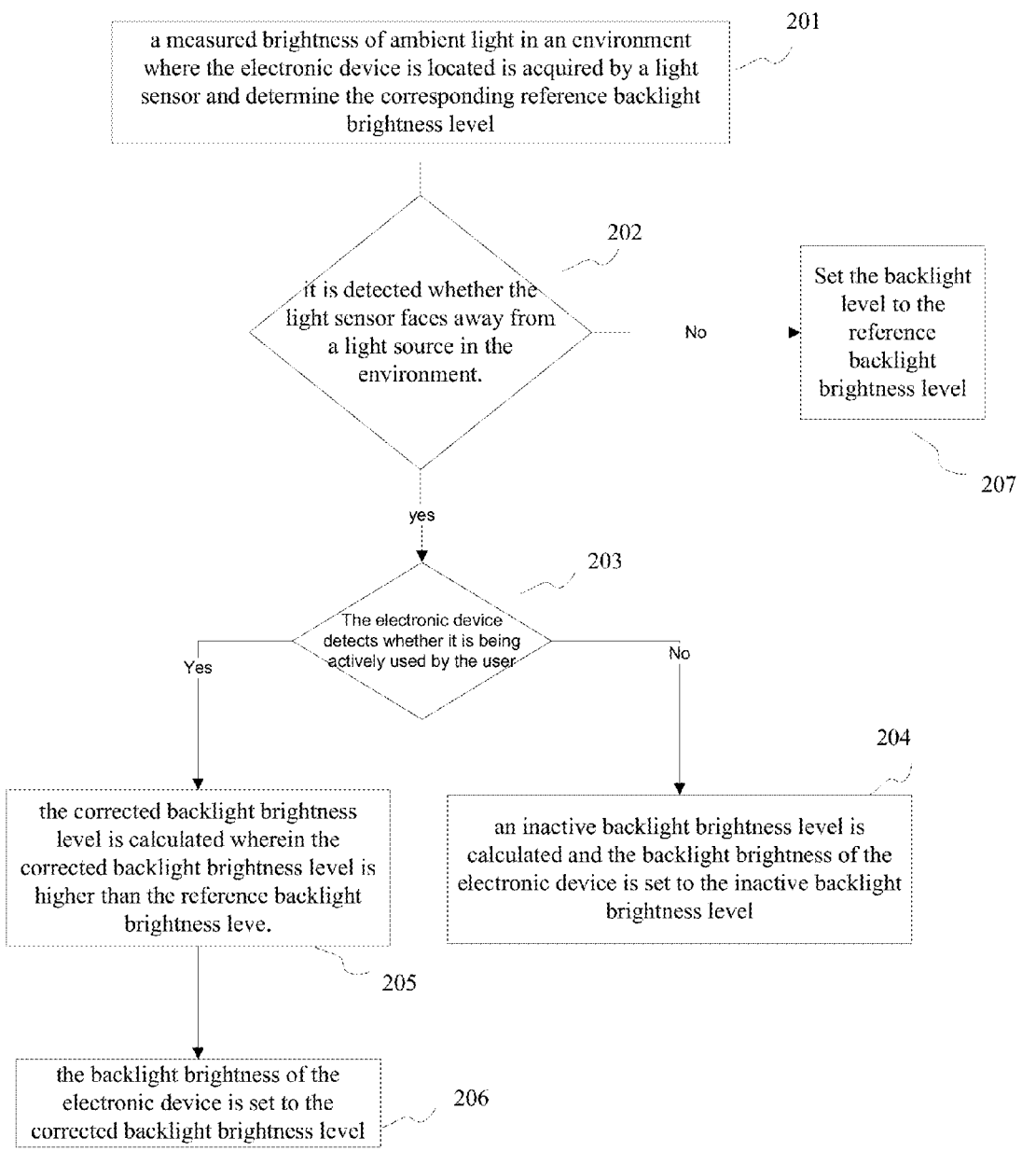
FIG. 2A is a flow chart showing a method for setting a brightness of a display screen according to another example embodiment of the present disclosure.

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the invention. Instead, they are merely examples of devices and methods consistent with aspects related to the invention as recited in the appended claims.

Terms used in the disclosure are only for purpose of describing particular embodiments, and are not intended to be limiting. The terms "a", "said" and "the" used in singular form in the disclosure and appended claims are intended to include a plural form, unless the context explicitly indicates otherwise. It should be understood that the term "and/or" used in the description means and includes any or all combinations of one or more associated and listed terms.

It should be understood that, although the disclosure may use terms such as "first", "second" and "third" to describe various information, the information should not be limited herein. These terms are only used to distinguish information of the same type from each other. For example, first information may also be referred to as second information, and the second information may also be referred to as the first information, without departing from the scope of the disclosure. Based on context, the word "if" used herein may be interpreted as "when", or "while", or "in response to a determination".

By way of introduction, brightness of an electronic display screen may be adjusted according to ambient light brightness at the display screen for comfortable viewing while avoiding high brightness level that unnecessarily drain battery power. Such power saving may be significant considering that a display screen is usually one of the major power consuming components in an electronic device. The ambient light brightness at the display screen may be monitored by a light sensor mounted on the electronic device. However, depending on the orientation of the light sensor and the electronic device with respect to the major light sources in the ambient environment, the light sensor may provide inaccurate measurement of the ambient light brightness at the display screen. For example, if the light sensor is not located on the same surface of the display screen and faces away from the major light sources in the environment, it may significantly under-measure the actual ambient brightness on the display screen. If the display brightness is adjusted according to the under-measured brightness value from the light sensor, the resulting displayed images may be too dim and insufficiently contrasted with the background light level, leading to viewing strain and eye fatigue for a user. In some embodiments in this disclosure below, additional sensors may be used to determine the relationship between the light sensor, the display screen, and the major ambient light sources. The display brightness may be adjusted upward if the electronic device detects that the light sensor is facing sway from the major light sources. Further, In some embodiments, particularly for the situation when the user is not actively using the electronic device, e.g., the electronic device is placed on top of a desk with the display screen facing against the desktop, the brightness of the screen may be adjust downward rather than upward to a very low level for power saving.

FIG. 1 is a flow chart showing a method for setting brightness of a display screen according to an example embodiment of the present disclosure. The method may be applied to an electronic device including but not limited to a mobile phone, a tablet computer, and a laptop computer. In step 101, a measured brightness of ambient light of an environment where the electronic device is located is acquired by a light sensor on the device. In step 105, a reference backlight brightness level is determined. In step 102, the electronic device detects whether the light sensor faces away from light sources in the environment. In step 106, if the light sensor is not facing away from the light sources, the reference brightness level is used to set the actual backlight level of the display screen. When the electronic device detects that the light sensor faces away from the light source, a corrected backlight brightness level is calculated in step 103 according to the measured brightness of the ambient light, and this corrected backlight brightness level is set as the actual backlight brightness level in step 104. The reference backlight brightness level is calculated using a backlight brightness level-setting function and assuming that the measured ambient brightness by the light sensor truly represents the actual ambient brightness. When the light sensor face away from the ambient light sources, because the light sensor may under-detect the ambient light level at the display screen, the corrected rather than reference backlight brightness level may be used for setting the actual backlight level. The corrected backlight brightness level is higher than the reference backlight brightness level because the actual ambient brightness is higher than the measured ambient brightness.

Specifically, the electronic device may pre-establish the backlight level-setting function based on experimental data on human comfort (for example, comfortable contrast level). The backlight level-setting function provides a correspondence between ambient brightness levels and the preferred backlight brightness levels that may be set for the display screen. This correspondence may depend on human visual characteristics and may be designed to increase viewing comfort and reduce eye fatigue. Generally, higher ambient brightness may correspond to brighter backlight level but the details of the correspondence may differ from individual to individual. The electronic device may be preloaded with a default backlight level-setting function based on an average person and then adjust the function for a particular user of the electronic device via user adjustments or machine learning. The backlight level-setting function may be stored in a memory of the device as a mapping between ambient brightness levels and backlight levels. It may alternatively be implemented algorithmically. For example, a default backlight level-setting function may be determined by experimental statistics and is shown by curve 212 of FIG. 2B. In this example, the backlight levels may be represented digitally by 8 bits, i.e., the backlight may be set at 256 discrete levels (from 0 to 255). Typical ambient light may have different optical spectral characteristics from the backlight. For example, the ambient light may typically be produced by thermal blackbody light emitting sources such as incandescent light bulbs, or the sun. The backlight of the display screen, on the other hand, may be produced by multi-single-colored red, blue and green LEDs. Because the optical spectral response of the light sensor may be different from human eyes, the measured ambient brightness by the light detector may be converted to perceived ambient brightness by human eyes according to curve 210 of FIG. 2B and then the perceived ambient brightness may be used as the ambient brightness in the backlight level-setting function of 212 in FIG. 2B.

The reference backlight brightness level may be determined by inputting the measured brightness of the ambient light by the light sensor into the backlight level-setting function. When the light sensor faces the ambient light source, the measured brightness may be a good approximation of the actual ambient light level and thus the reference backlight brightness level corresponding to the measured ambient brightness determined by the backlight level-setting function may be appropriate level for setting the backlight level in the display screen. But When the light sensor is facing away from the ambient light sources, it may undermeasure the true ambient brightness. This may be due to, for example, the reduced light flux into the light sensor as the opening of the light sensor may be angled with respect to the ambient light sources. This may also be due to a shadowing effect of the surrounding walls of the opening on the electronic device leading into the light sensor. Thus, the corresponding reference backlight brightness level may underestimate backlight level needed. Thus, the electronic device in the embodiment of FIG. 1 may adjust the reference backlight brightness level upward to obtain a corrected backlight brightness level and then set the actual backlight level to the corrected backlight brightness level. In such a way, the backlight level is set more accurately and appropriately to reflect the true ambient brightness (which may be under-measured by the light sensor when the light sensor is facing away from the ambient light sources), improving user viewing experience and reducing eye fatigue.

Figure 2B:
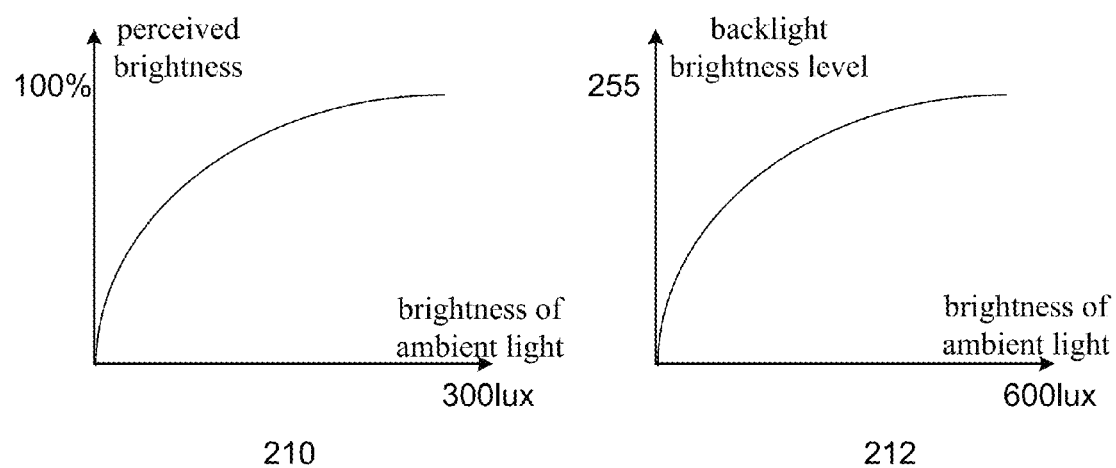
FIG. 2B is a schematic diagram illustrating a backlight brightness level-setting function according to an example embodiment of the present disclosure.

FIG. 2A is a flow chart showing a method for setting a brightness of a display screen of an electronic device according to another example embodiment of the present disclosure. In step 201, a measured brightness of ambient light in an environment where the electronic device is located is acquired by a light sensor installed in the electronic device. The ambient light in the environment where the electronic device is located may be generated by a point light source, or by other light sources. The point light source may be the sun, a lamp, etc. The ambient light may be generated by multiple light sources. Further, the ambient light may include diffused or scattered light from surfaces such as walls. The light sensor may detect an average effect of the all ambient light entering the light sensor. Also in step 201, the electronic device further determines the reference backlight brightness level based on the measured ambient brightness according to the backlight brightness level-setting function.

In step 202, the electronic device detects whether the light sensor faces away from a light source in the environment. When the light sensor faces the light source, the brightness measured by the light sensor may approximate actual brightness of the ambient light. Thus, the electronic device may set the actual backlight brightness level at the reference backlight brightness level in step 207. When the light sensor faces away from the light source, the brightness measured by the light sensor may be less than the actual brightness of the ambient light at the display screen. In this case, the reference backlight brightness level calculated via the backlight brightness level-setting function may be too low and such backlight level may yield a low display contrast and induce strain on the eyes of the viewer. Therefore, it is beneficial to adjust the backlight level based on whether the light sensor faces away from the ambient light sources.

Two exemplary implementations are given below for detecting whether the light sensor faces away from the light source. In a first implementation, the following steps may be performed.

1) The electronic device determines a measurement plane where the light sensor is located.

2) The electronic device detects an orientation of the measurement plane using a gravity sensor and determines whether the measurement plane faces a direction of the ambient light source, wherein the direction of the ambient light source is a default direction or a direction input by the user. If the measurement plane faces the direction of the light source, the light sensor is deemed facing the ambient light source. Otherwise, the light sensor may be deemed as facing away from the ambient light source.

Specifically, a measurement plane where the light sensor is located is determined. The measurement plane may be the plane of the front surface or the plane of the back surface or other planes of the electronic device. Since the light sensor is affixed in a certain designed position of the electronic device in the factory, the measurement plane where the light sensor is located is a known parameter. Generally, the light sensor is installed on the front surface of the electronic device.

After determining the measurement plane, the electronic device may determine the orientation of the measurement plane of the electronic device by a sensor, and then may determine the direction of the light source, and then detect whether the light sensor faces away from the light source according to the orientation of the measurement plane and the direction of the ambient light sources.

Figure 2C:
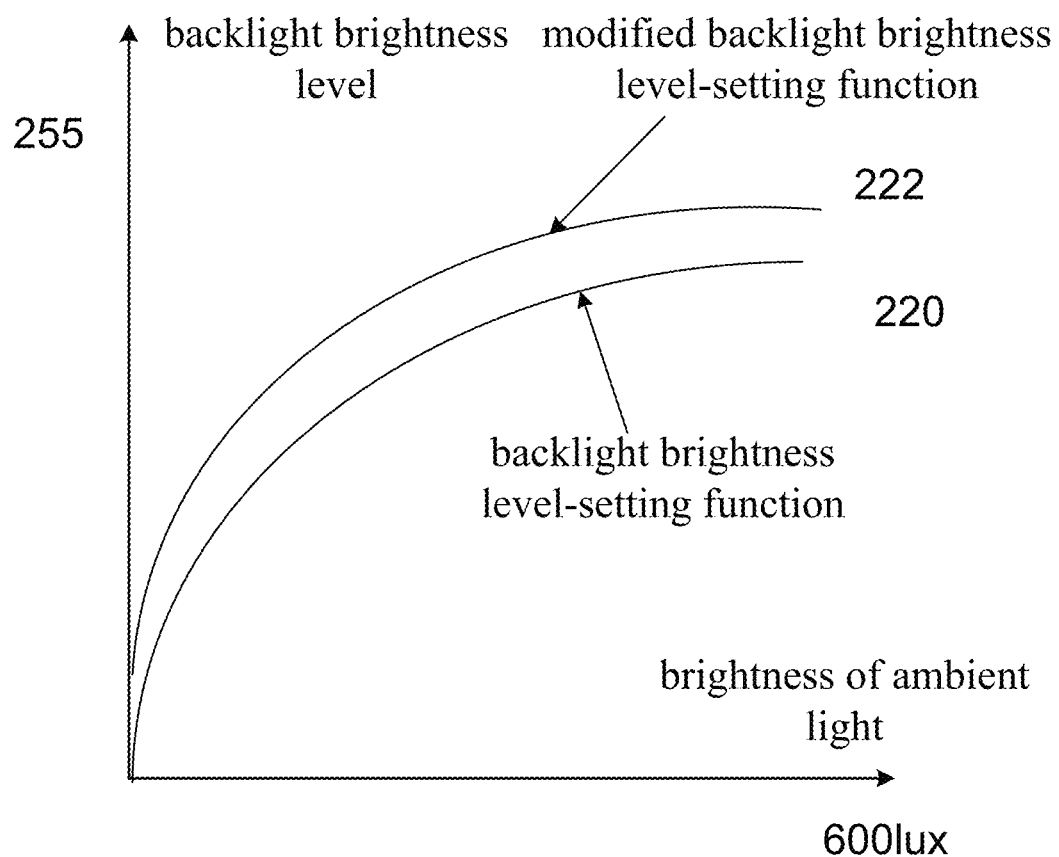
FIG. 2C is a schematic diagram illustrating a comparison of a backlight brightness level-setting function and a modified backlight brightness level-setting function according to an example embodiment of the present disclosure.
Figure 2D:
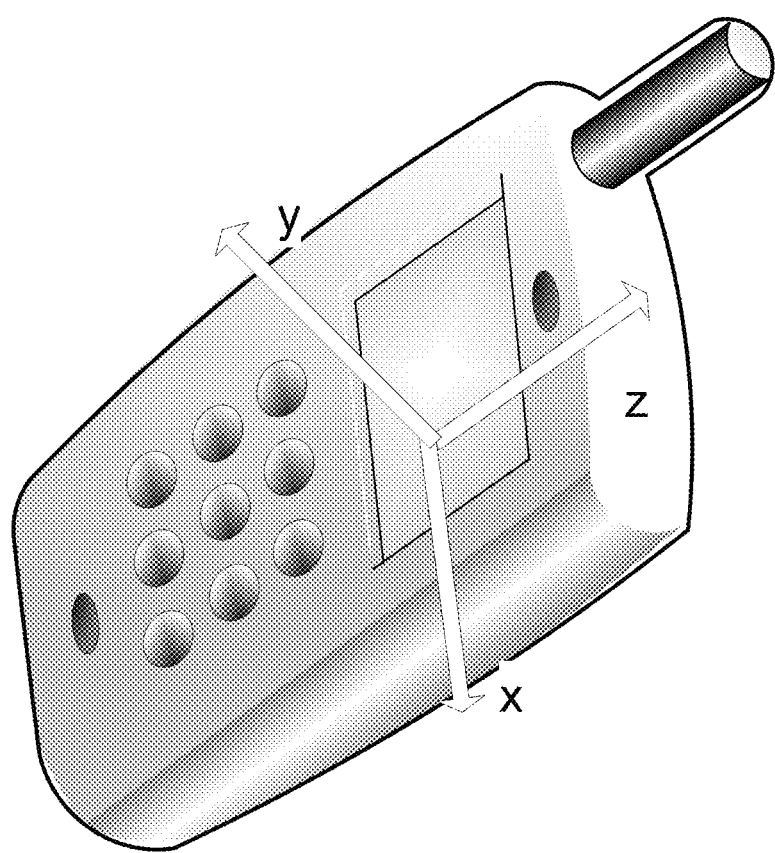
FIG. 2D illustrates an exemplary coordinate setup for determining orientation of the electronic device.

There are various ways for determining the orientation of the measurement plane. In one implementation, a gravity sensor may be used to determine the orientation of the measurement plane. In this implementation, the electronic device may establish a coordinate system. Assuming that the display interface (display screen) of the electronic device is the xz plane, the center of the electronic device is the origin of coordinate. As shown in FIG. 2D, the positive axis of the x-axis may be towards the right side of the electronic device. The z axis is perpendicular to the x axis on the plane of the electronic device. The positive axis of the z-axis may be towards the upper part of the electronic device in the xz plane. The y axis is perpendicular to the display plane of the electronic device, the positive axis of the y-axis may point from the side of the display screen (front face of the electronic device, for example) and away from the electronic device and the xz plane. The electronic device may measure the acceleration of the electronic device along the y-axis by the gravity sensor. When the gravity acceleration direction is towards the positive axis of the y-axis, it may be determined that the positive y axis is pointing to the same direction as the gravity, i.e., the measurement plane faces downward. When the gravity acceleration direction is towards the negative axis of the y-axis, it may be determined that the positive y axis is pointing to the opposite direction as the gravity, i.e., the measurement plane faces upward.

The direction of the light source may be a default direction. For example, the light source may be assumed to be above the electronic device. Alternatively, the direction of the light source may be input by the user or the user may modify the default direction. When the user inputs the direction, the electronic device may provide an input box, or the electronic device may display the user selectable options for the position of the light source. For example, the electronic device may display two options: (1) "the light source is above the electronic device" and (2) "the light source is below the electronic device". If the user selects the first option, the electronic device determines that the ambient light source is above electronic device. Typically, the light source is disposed above the electronic device.

The electronic device may then determine whether the light sensor faces away from the light source according to the orientation of the measurement plane and the direction of the ambient light sources. For example, when the ambient light source is above the electronic device and the light sensor is on the front surface of the electronic device, the electronic device may detect whether the front surface of the electronic device is facing upwards by the gravity sensor. If the front surface of the electronic does face upwards, the electronic device determines that the light sensor faces the ambient light source. If the front surface of the electronic device faces downwardly, the electronic device determines that the light sensor faces away from the ambient light source.

In a second implementation for detecting whether the light sensor faces away from the light source in the environment, the following steps may be performed by the electronic device.

1) A secondary measured brightness of the ambient light is acquired by a preset device of the electronic device that faces opposite direction to the direction the light sensor faces. The preset device may be another light sensor or a camera.

2) The measured brightness acquired by the light sensor is compared with the secondary measured brightness acquired by the preset device. If the measured brightness by the light sensor is greater than the secondary measured brightness acquired by the preset device, the electronic device determines that the light sensor faces the ambient light sources. Otherwise, the electronic device determines that the light sensor faces away from the ambient light sources.

For example, the electronic device may include the preset device other than the light sensor capable of acquiring the brightness of the ambient light. It may be another light sensor or a camera. The plane where the preset device is located faces the direction opposite to the plane where the light sensor is located. Thus, when the light sensor is on the front surface of the electronic device, the preset device may be on the back surface of the electronic device, and the preset device may be a rear camera. When the light sensor is on the back surface of the electronic device, the preset device may be on the front surface of the electronic device, and the preset device may be a front camera. The electronic device may acquire the secondary measured brightness of the ambient light by the preset device, and compare the measured brightness acquired by the light sensor with the secondary measured brightness acquired by the preset device, and detect whether the light sensor faces away from the light source according to the comparison result. The order of acquiring the brightness by the light sensor and acquiring the brightness by the preset device is not limited in this embodiment. Assume that the measured brightness acquired by the light sensor is 400 lux. If the secondary measured brightness acquired by the preset device is 300 lux, the electronic device determines that the light sensor faces the ambient light source. If the secondary measured brightness acquired by the preset device is, e.g., 500 lux, the electronic devices determined that the light sensor faces away from the light source. Because the light sensor and the preset device are separate and may be different types of sensors, the comparison between the measured brightness and the secondary measured brightness may need to be on a calibrated basis.

For another example, the electronic device may measure the brightness of the ambient light twice by the light sensor, and the orientations of the measurement planes of the two measurements are switched in between (and are thus are of opposite direction). If the brightness acquired in step 201 is defined as a measured brightness, the electronic device may record the direction that the measurement plane faces when measuring the measured brightness, and then the measurement plane is switched by the user to face an opposite direction, the electronic device may measure a secondary measured brightness by the same light sensor, compare the measured brightness with the secondary measured brightness, and determine that the light sensor faces away from the light source if the secondary measured brightness is greater than the measured brightness and that the light sensor faces the light source if the secondary measured brightness is less than the measured brightness.

If the electronic device determines that the light sensor faces away from the light in step 202, the electronic device may further detect in step 203 whether it is being actively used by the user. If it is detected that the electronic device is not being actively used by the user, step 204 is executed. Otherwise, steps 205 and 206 are executed.

One application scenario may illustrate the utility of step 203. In this application scenario, the user places the electronic device on an object and the light sensor faces away from the light source. The user is thus not actively using the electronic device. If a high backlight brightness level is set to the corrected backlight brightness level, the power of the electronic device maybe wasted, affecting the overall user experience. Thus, before setting the backlight brightness, it is beneficial for the electronic device to detect whether it is being actively used by the user.

The electronic device may detect whether the electronic device is being used by the user in at least one of the following two ways. In a first way, the electronic device may obtain a distance between the object and the electronic device by a distance sensor and detect whether the distance is less than a distance threshold. The distance sensor may be implemented, for example, as an infrared range sensor or a laser range sensor. If the distance is less than the distance threshold, it is determined that the electronic device is located on or near the object and thus the electronic device is not being actively used by the user. If the distance is greater than the distance threshold, it is determined that the electronic device is not located on or close to the object and thus the electronic device is being actively used by the user. The distance sensor and the light sensor are preferably located on a same plane. In a second way, the electronic device may detect whether an operation from the user is received. If the electronics does not receive the operation from the user for predetermined period of time, it determines that it is not being actively used by the user. If the electronic device receives the operation from the user within the predetermined period of time, it is determined that the electronic device is being actively used by the user.

If the electronic device is not being actively used, in step 204, an inactive backlight brightness level is calculated and the backlight brightness of the electronic device is set to the inactive backlight brightness level. The inactive backlight brightness level may be less than the corrected backlight brightness level that may be determined in step 205 below. The inactive backlight brightness level may be the reference backlight brightness level calculated according to the brightness of the ambient light, or may be a fixed level, or may be a random level less than the corrected backlight brightness level. In some embodiment, it may be a level less than the reference backlight brightness level.

If the electronic device is being actively used, in step 205, the corrected backlight brightness level is calculated according to the measured brightness of the ambient light. The corrected backlight brightness level is higher than a reference backlight brightness level, and the reference backlight brightness level is calculated according to the measured brightness of the ambient light when the light sensor faces the light source. Specifically for determining the corrected backlight brightness level and in one implementation, since the measured brightness acquired by the light sensor is less than the actual brightness of the ambient light when the light sensor faces away from the light source, the electronic device may calculate a modified backlight brightness level-setting function according to the backlight brightness level-setting function, such that the corrected backlight brightness level calculated according to the measured brightness and the modified backlight brightness level-setting function is greater than the reference backlight brightness level calculated according to the measured brightness and the backlight brightness level-setting function. The way for modifying the backlight brightness level-setting function into the modified backlight brightness level-setting function is not being limited in this embodiment. FIG. 2C illustrates a comparison between the backlight brightness level-setting function (220) and the modified backlight brightness level-setting functions (222).

Alternatively for determining the corrected backlight brightness level in another implementation, the electronic device may calculate the corrected backlight brightness level according to the reference backlight brightness level rather than the modified backlight brightness level-setting function. For example, the electronic device may obtain the corrected backlight brightness level by adding to the reference backlight brightness level with a preset value, or by multiplying the reference backlight brightness level by a preset ratio. For example, the electronic device may set the preset ratio to a value in a range of, e.g., 1.05 to 1.1.

In step 206, the backlight brightness of the electronic device is set to the corrected backlight brightness level when the light sensor face away from ambient light sources and the electronic device is being actively used.

A practical example is given below for setting the brightness of the display screen according to the exemplary embodiment of this disclosure. Assume that the brightness of the ambient light illuminated by a fluorescent lamp, shown by 230 of FIG. 2E, at the electronic device 231 is 400 lux. Further assume that the light sensor is located on one edge of the electronic device as illustrated by sensor 232 in FIG. 2E. When the electronic device is oriented in a forward direction, i.e. the light sensor faces the fluorescent lamp, as shown by configuration 234 in FIG. 2E, the measured brightness may be 400 lux, and the calculated reference backlight brightness level according to curve 212 of FIG. 2B may be 100 (100 in a range of 0-255, where 0 is for no backlight, and 255 is for maximum backlight). Because the electronic device will detect that the light sensor is not facing away from the ambient light source, it may set the backlight level to the reference backlight brightness level of 100. When the electronic device is oriented in the opposite direction, i.e., the light sensor faces away from the fluorescent lamp, as shown by the configuration 236 in FIG. 2E, the measured brightness may be 370 lux. The reference backlight brightness level corresponding to 370 lux may be 80 (80 in a range of 0-255). Because the electronic device will determine that the light sensor is facing away from the lamp, it will calculate the corrected backlight brightness level according to, for example, FIG. 2C (the modified backlight brightness level-setting function). The corrected backlight brightness level may be 99 rather than 80. Thus, for both configuration 234 and 236, the backlight is set at similar levels (100 and 99) even though the light sensor detects very different measured ambient brightness (400 lux versus 370 lux).

In summary, with the methods for setting a brightness of a display screen provided by the present disclosure, the brightness of the ambient light in the environment where the electronic device is located is acquired by the light sensor, and it is detected whether the light sensor faces away from the light source in the environment, and the corrected backlight brightness level is calculated according to the brightness of the ambient light if it is detected that the light sensor faces away from the light source, wherein the corrected backlight brightness level is higher than the reference backlight brightness level calculated according to the brightness of the ambient light when the light sensor faces the light source, and then the backlight brightness of the electronic device is set to the corrected backlight brightness level. Since the brightness acquired by the light sensor is lower than the actual brightness of the ambient light when the light sensor faces away from the light source, the corrected backlight brightness level calculated when the light sensor faces away from the light source is higher than the reference backlight brightness level calculated when the light sensor faces the light source. In such away, the electronic device may set a more appropriate backlight level even when the light sensor may not accurately measure the true ambient light brightness. The methods thus help enhance user viewing experience and reduce eye fatigue.

In addition, by calculating the inactive backlight brightness level when it is detected that the electronic device is not being used by the user and setting the backlight brightness of the electronic device to the inactive backlight brightness level which is less than the corrected backlight brightness level, the backlight brightness is low when the user is not using the electronic device, providing power savings for the user.

Figure 3:
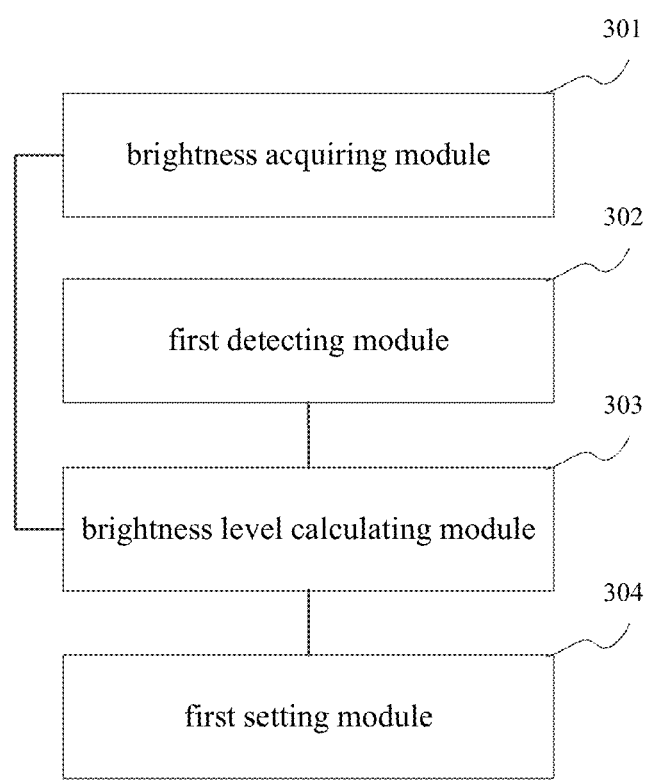
FIG. 3 is a block diagram showing an apparatus for setting a brightness of a display screen according to an example embodiment of the present disclosure.

FIG. 3 is a block diagram showing an apparatus for setting a brightness of a display screen according to an example embodiment of the present disclosure. The apparatus for setting a brightness of a display screen may be applied in an electronic device such as a mobile terminal, a tablet computer, and a laptop computer. As shown in FIG. 3, the apparatus for setting a brightness of a display screen includes a brightness acquiring module 301, a first detecting module 302, a brightness level calculating module 303 and a first setting module 304.

The brightness acquiring module 301 is configured to acquire by a light sensor a measured brightness of ambient light in an environment where the electronic device is located. The first detecting module 302 is configured to detect whether the light sensor faces away from a light source in the environment. The brightness level calculating module 303 is configured to calculate a corrected backlight brightness level according to the measured brightness of the ambient light acquired by the brightness acquiring module 301 if the first detecting module 302 detects that light sensor faces away from the light source. The corrected backlight brightness level is higher than a reference backlight brightness level, and the reference backlight brightness level is calculated according to measured brightness of the ambient light when the light sensor faces the light source. The first setting module 304 is configured to set a backlight brightness of the electronic device to the corrected backlight brightness level calculated by the brightness level calculating module 303.

Figure 4:
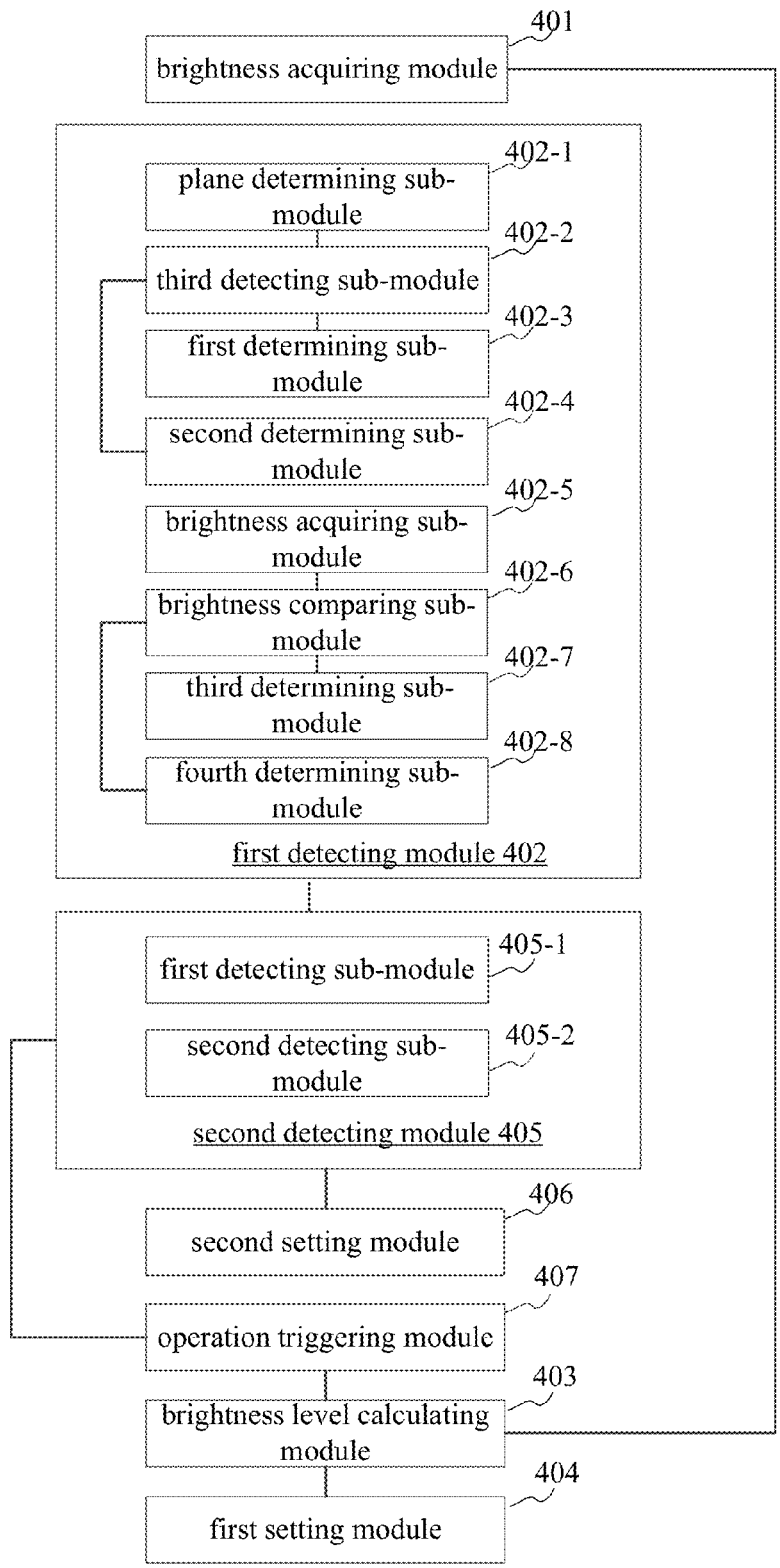
FIG. 4 is a block diagram showing an apparatus for setting a brightness of a display screen according to an example embodiment of the present disclosure.

FIG. 4 is a block diagram showing an apparatus for setting a brightness of a display screen according to an example embodiment of the present disclosure. The apparatus for setting a brightness of a display screen may be applied in an electronic device such as a mobile terminal, a tablet computer, and a laptop computer. As shown in FIG. 4, and similar to FIG. 3, the apparatus for setting a brightness of a display screen includes a brightness acquiring module 401, a first detecting module 402, a brightness level calculating module 403 and a first setting module 404. The brightness acquiring module 401 is configured to acquire by a light sensor a measured brightness of ambient light in an environment where the electronic device is located. The first detecting module 402 is configured to detect whether the light sensor faces away from a light source in the environment. The brightness level calculating module 403 is configured to calculate a corrected backlight brightness level according to the measured brightness of the ambient light acquired by the brightness acquiring module 401 if the first detecting module 402 detects that light sensor faces away from the light source. The corrected backlight brightness level is higher than a reference backlight brightness level, and the reference backlight brightness level is calculated according to measured brightness of the ambient light when the light sensor faces the light source. The first setting module 404 is configured to set a backlight brightness of the electronic device to the corrected backlight brightness level calculated by the brightness level calculating module 403.

The apparatus of FIG. 4 further includes a second detecting module 405, a second setting module 406 and an operation triggering module 407. The second detecting module 405 is configured to detect whether the electronic device is being used by a user. The second setting module 406 is configured to calculate an inactive backlight brightness level and set the backlight brightness of the electronic device to the inactive backlight brightness level, when the second detecting module 405 detects that the electronic device is not being used by the user. The inactive backlight brightness level is lower than the corrected backlight brightness level calculated according to the measured brightness of the ambient light when the light sensor faces away from the light source. The operation triggering module 407 is configured to trigger an operation of calculating the corrected backlight brightness level according to the measured brightness of the ambient light if the second detecting module 405 detects that the electronic device is being used by the user.

In one implementation, the second detecting module 405 alternatively includes a first detecting sub-module 405-1 or a second detecting sub-module 405-2. The first detecting sub-module 405-1 is configured to detect by a distance sensor whether an object with a distance from the electronic device being less than a distance threshold exists. The second detecting sub-module 405-2 is configured to detect by the electronic device whether an operation triggered by the user is received.

In one implementation, the first detecting module 402 may include a plane determining sub-module 402-1, a third detecting sub-module 402-2, a first determining sub-module 402-3 and a second determining sub-module 402-4. The plane determining sub-module 402-1 is configured to determine a measurement plane where the light sensor is located. The third detecting sub-module 402-2 is configured to detect by a gravity sensor whether the measurement plane determined by the plane determining module 402-1 faces a direction of the light source, in which the direction of the light source is a either default direction or a direction input by the user. The first determining sub-module 402-3 is configured to determine that the light sensor faces the light source if the measurement plane faces the direction of the light source. The second determining sub-module 402-4 is configured to determine that the light sensor faces away from the light source if the measurement plane does not face the direction of the light source.

In an alternative implementation, the first detecting module 402 may include a brightness acquiring sub-module 402-5, a brightness comparing sub-module 402-6, a third determining sub-module 402-7 and a fourth determining sub-module 402-8. The brightness acquiring sub-module 402-5 is configured to acquire by a preset device in the electronic device a secondary measured brightness of the ambient light, wherein a plane where the preset device is located faces a direction opposite to a plane where the light sensor is located and the preset device is another light sensor or a camera. The brightness comparing sub-module 402-6 is configured to compare the measured brightness of the ambient light acquired by the light sensor with the secondary measured brightness of the ambient light acquired by the preset device. The third determining sub-module 402-7 is configured to determine that the light sensor faces the light source if the measured brightness of the ambient light acquired by the light sensor is greater than the secondary measured brightness of the ambient light acquired by the preset device. The fourth determining sub-module 402-8 is configured to determine that the light sensor faces away from the light source if the measured brightness of the ambient light acquired by the light sensor is less than the secondary measured brightness of the ambient light acquired by the preset device.

With respect to the devices in the above embodiments, the specific manners for performing operations for individual modules therein have been described in detail in the embodiments regarding the methods for obtaining a photograph, which are not elaborated herein again.

Figure 5:
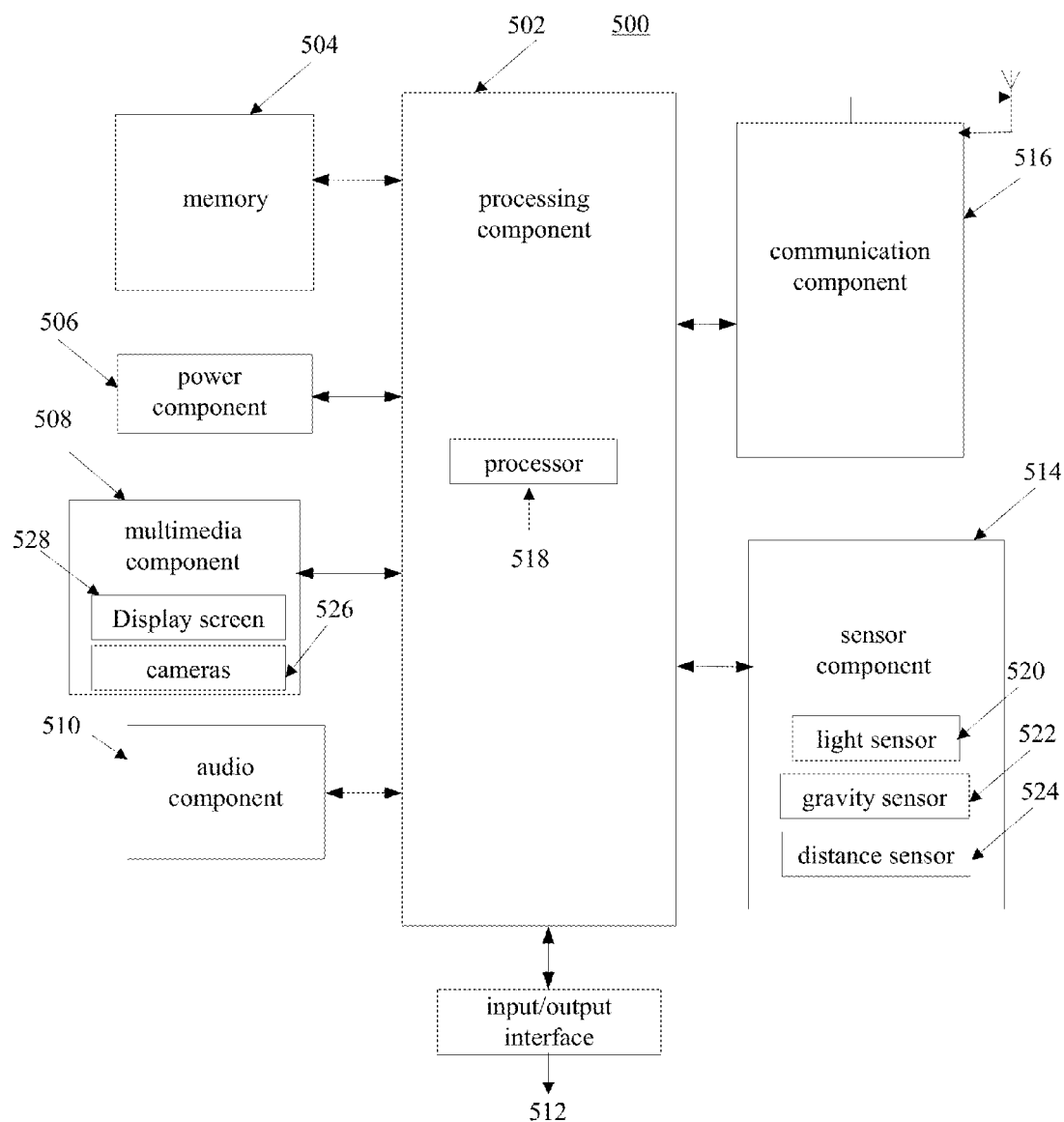
FIG. 5 is a block diagram showing a device for setting a brightness of a display screen according to an example embodiment of the present disclosure.

FIG. 5 is a block diagram showing a device 500 for setting a brightness of a display screen according to an example embodiment of the present disclosure. For example, the device 500 may be a mobile phone, a computer, a digital broadcasting electronic device, a message sending and receiving device, a game console, a flat panel device, a medical device, a fitness device, a personal digital assistant, or the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 controls overall operations of the device 500, such as the operations associated with display, telephone calls, data communications, camera operations, and recording operations. The processing component 502 may include one or more processors 518 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The memory stores instructions, when executed by the processing component 502, causes the device 500 to perform the methods of setting backlight of a display screen in the multimedia component 508, as described above.

The power component 506 provides power to various components of the device 500. The power component 506 may include a power management system, one or more power sources, and any other components associated with the generation, management, and distribution of power in the device 500.

The multimedia component 508 includes a display screen 528 providing an output interface between the device 500 and the user. In some embodiments, the display screen may include a liquid crystal display (LCD) and a touch panel (TP). The LCD display includes a backlight that may be controlled as discussed in the method embodiment above. If the display screen includes the touch panel, the display screen may be implemented as a touch display screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera 526. The front camera and the rear camera may receive an external multimedia data while the device 500 is in an operation mode, such as a photographing mode or a video mode. Each of the front camera and the rear camera may be a fixed optical lens system or have focus and optical zoom capability. These cameras 526 may be the preset device for providing the secondary measured ambient brightness discussed in the method embodiment above.

The audio component 510 is configured to output and/or input audio signals. For example, the audio component 510 includes a microphone (MIC) configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor 520, such as a CMOS or CCD image sensor for use in imaging applications or a photo diode. The light sensor may be used to provide the measured ambient brightness discussed above in the method embodiments of the present disclosure. In some embodiments, the sensor component 514 may also include an accelerometer sensor, a gyroscope sensor or gravity sensor (522), a magnetic sensor, a pressure sensor, or a temperature sensor or thermometer. The gravity sensor 522 may be used to make orientation and gravity measurements as discussed above in the method embodiments and may be based on a gyroscope. It may be based on an accelerometer and gyroscope.

The communication component 516 is configured to facilitate communication, wired or wirelessly, between the device 500 and other devices. The device 500 can access a wireless network based on a communication standard, such as Wi-Fi, 2G, 3G, LTE, or 4G cellular technologies, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 518 in the device 500, for performing the above-described methods. For example, the non-transitory computer-readable storage medium may be a ROM, a RAM, a CD-ROM, a magnetic tape, a floppy disc, an optical data storage device, and the like.

Each module or unit discussed above for FIGS. 3-4, such as the brightness acquiring module, the first detecting module, the brightness level calculating module, the first setting module, the plane determining submodule, the third detecting sub-module, the first determining sub-module, the second determining sub-module, the brightness acquiring sub-module, the brightness comparing sub-module, the third determining sub-module, the fourth determining sub-module, the first detecting sub-module, the second detecting sub-module, and the operation triggering sub-module may take the form of a packaged functional hardware unit designed for use with other components, a portion of a program code (e.g., software or firmware) executable by the processor 518 or the processing circuitry that usually performs a particular function of related functions, or a self-contained hardware or software component that interfaces with a larger system, for example.

The illustrations of the embodiments described herein are intended to provide a general understanding of the structure of the various embodiments. The illustrations are not intended to serve as a complete description of all of the elements and features of apparatus and systems that utilize the structures or methods described herein. Other embodiments of the disclosure will be apparent to those skilled in the art from consideration of the specification and practice of the embodiments disclosed herein. This application is intended to cover any variations, uses, or adaptations of the disclosure following the general principles thereof and including such departures from the present disclosure as come within known or customary practice in the art. It is intended that the specification and examples are considered as exemplary only, with a true scope and spirit of the invention being indicated by the following claims in addition to the disclosure.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for setting brightness of a backlighted display screen of an electronic device, comprising:
    acquiring by a light sensor on the electronic device a measured brightness of ambient light having an actual ambient brightness at where the electronic device is located;
    detecting whether the light sensor faces away from a light source in the environment;
    when it is detected that the light sensor does not face away from the light source,
    determining a reference backlight brightness level according to a backlight brightness level-setting function comprising a correspondence between actual ambient brightness levels and backlight brightness levels, by using the measured brightness as actual ambient brightness; and
    setting an actual backlight brightness of the backlighted display screen to the reference backlight brightness level; and
    when it is detected that the light sensor faces away from the light source, setting the actual backlight brightness of the backlighted display screen at a level different from the reference backlight brightness level.

2. The method of claim 1, wherein setting the actual backlight brightness at the level different from the reference backlight brightness level comprises:
    increasing the reference backlight brightness level to obtain a corrected backlight brightness level; and
    setting the actual backlight brightness of the backlighted display screen to the corrected backlight brightness level.

3. The method according to claim 1, wherein setting the actual backlight brightness at the level different from the reference backlight brightness level comprises:
    detecting whether the electronic device is being actively used by a user;
    when it is determined that the user is actively using the electronic device,
    modifying the reference backlight brightness level upward to obtain a corrected backlight brightness level; and
    setting the actual backlight brightness of the backlighted display screen to the corrected backlight brightness level; and
    when it is determined that the user is not actively using the electronic device,
    modifying the reference backlight brightness level to obtain an inactive backlight brightness level; and
    setting the actual backlight brightness of the backlighted display screen to the inactive backlight brightness level.

4. The method according to claim 3, wherein detecting whether the electronic device is being actively used by a user comprises:
    detecting by a distance sensor whether an object with a distance from the electronic device being less than a predetermined distance threshold exists; or
    detecting by the electronic device whether an operation by the user is received.

5. The method according to claim 1, wherein detecting whether the light sensor faces away from the light source comprises:
    determining a measurement plane where the light sensor is located;
    detecting by a gravity sensor whether the measurement plane faces a direction of the light source, wherein the direction of the light source is a default direction or a direction input by a user;
    determining that the light sensor faces the light source when the measurement plane faces the direction of the light source; and
    determining that the light sensor faces away from the light source when the measurement plane does not face the direction of the light source.

6. The method according to claim 1, wherein detecting whether the light sensor faces away from the light source comprises:
    acquiring by a preset device in the electronic device a secondary measured brightness of the ambient light, wherein a surface of the electronic device where the preset device is installed faces a direction opposite to another surface of the electronic device where the light sensor is installed and wherein the preset device is another light sensor or a camera;
    comparing the measured brightness of the ambient light acquired by the light sensor with the secondary measured brightness of the ambient light acquired by the preset device;
    determining that the light sensor faces the light source if the measured brightness is greater than the secondary measured brightness; and
    determining that the light sensor faces away from the light source if the measured brightness is less than the secondary measured brightness.

7. An electronic device, comprising:
    a backlighted display screen;
    a light sensor installed on a surface on the electronic device; and
    a processor configured to:

acquire by the light sensor a measured brightness of ambient light having an actual ambient brightness at where the electronic device is located;

detect whether the light sensor faces away from a light source in the environment;

when it is detected that the light sensor does not face away from the light source, determine a reference backlight brightness level according to a backlight brightness level-setting function comprising a correspondence between actual ambient brightness levels and backlight brightness levels, by using the measured brightness as actual ambient brightness; and set an actual backlight brightness of the backlighted display screen to the reference backlight brightness level; and when it is detected that the light sensor faces away from the light source, set the actual backlight brightness of the backlighted display screen at a level different from the reference backlight brightness level.

8. The electronic device of claim 7, wherein, to set the actual backlight brightness at the level different from the reference backlight brightness level, the processor is configured to:

modify the reference backlight brightness level upward to obtain a corrected backlight brightness level; and set the actual backlight brightness of the backlighted display screen to the corrected backlight brightness level.

9. The electronic device according to claim 7, wherein, to set the actual backlight brightness at the level different from the reference backlight brightness level, the processor is configured to:

detect whether the electronic device is being actively used by a user;

when it is determined that the user is actively using the electronic device, modify the reference backlight brightness level upward to obtain a corrected backlight brightness level; and set the actual backlight brightness of the backlighted display screen to the corrected backlight brightness level; and when it is determined that the user is not actively using the electronic device, modify the reference backlight brightness level to obtain an inactive backlight brightness level; and set the actual backlight brightness of the backlighted display screen to the inactive backlight brightness level.

10. The electronic device according to claim 9, further comprising a distance sensor, wherein, to detect whether the electronic device is being actively used the user, the processor is configured to:

causing the distance sensor to detect whether an object with a distance from the electronic device being less than a predetermined distance threshold exists; or causing the electronic device to detect whether an operation by the user is received.

11. The electronic device according to claim 7, further comprising a gravity sensor, wherein, to detect whether the light sensor faces away from the light source, the processor is configured to:

determine a measurement plane where the light sensor is located;

causing the gravity sensor to detect whether the measurement plane faces a direction of the light source, wherein the direction of the light source is a default direction or a direction input by the user;

determining that the light sensor faces the light source if the measurement plane faces the direction of the light source; and determining that the light sensor faces away from the light source if the measurement plane does not face the direction of the light source.

12. The electronic device according to claim 7, further comprising a preset device, wherein, to detect whether the light sensor faces away from the light source, the processor is configured to:

causing the preset device to acquire a secondary measured brightness of the ambient light, wherein a plane where the preset device is located faces a direction opposite to a plane where the light sensor is located, and the preset device is another light sensor or a camera;

compare the measured brightness of the ambient light acquired by the light sensor with the secondary measured brightness of the ambient light acquired by the preset device;

determine that the light sensor faces the light source if the measured brightness of the ambient light acquired by the light sensor is greater than the secondary measured brightness of the ambient light acquired by the preset device; and determine that the light sensor faces away from the light source if the measured brightness of the ambient light acquired by the light sensor is less than the secondary measured brightness of the ambient light acquired by the preset device.

13. A non-transitory computer-readable storage medium having stored therein instructions that, when executed by a processor of an electronic device having a backlighted display screen, causes the electronic device to:

acquire by a light sensor on the electronic device a measured brightness of ambient light having an actual ambient brightness at where the electronic device is located;

detect whether the light sensor faces away from a light source in the environment;

when it is detected that the light sensor does not face away from the light source, determine a reference backlight brightness level according to a backlight brightness level-setting function comprising a correspondence between actual ambient brightness levels and backlight brightness levels, by using the measured brightness as actual ambient brightness; and set an actual backlight brightness of the backlighted display screen to the reference backlight brightness level; and when it is detected that the light sensor faces away from the light source, set the actual backlight brightness of the backlighted display screen at a level different from the reference backlight brightness level.

14. The non-transitory computer-readable storage medium according to claim 13, wherein the instructions, when executed by the processor to set the actual backlight brightness at the level different from the reference backlight brightness level, causes the electronic device to:

modify the reference backlight brightness level upward to obtain a corrected backlight brightness level; and set the actual backlight brightness of the backlighted display screen to the corrected backlight brightness level.

15. The non-transitory computer-readable storage medium according to claim 13, wherein the instructions, when executed by the processor to set the actual backlight brightness at the level different from the reference backlight brightness level, causes the electronic device to:
   detect whether the electronic device is being actively used by a user;
   when it is determined that the user is actively using the electronic device,
   modify the reference backlight brightness level upward to obtain a corrected backlight brightness level; and
   set the actual backlight brightness of the backlighted display screen to the corrected backlight brightness level; and
   when it is determined that the user is not actively using the electronic device,
   modify the reference backlight brightness level to obtain an inactive backlight brightness level; and
   set the actual backlight brightness of the backlighted display screen to the inactive backlight brightness level.

16. The non-transitory computer-readable storage medium according to claim 15, wherein the instructions, when executed by the processor to detect whether the electronic device is being actively used by a user, causes the electronic device to:
   detect by a distance sensor whether an object with a distance from the electronic device being less than a predetermined distance threshold exists; or
   detect whether an operation by the user is received.

17. The non-transitory computer-readable storage medium according to claim 13, wherein the instructions, when executed by the processor to detect whether the light sensor faces away from the light source, causes the electronic device to:
   determine a measurement plane where the light sensor is located;
   detect by a gravity sensor whether the measurement plane faces a direction of the light source, wherein the direction of the light source is a default direction or a direction input by a user;
   determine that the light sensor faces the light source if the measurement plane faces the direction of the light source; and
   determining that the light sensor faces away from the light source if the measurement plane does not face the direction of the light source.

18. The non-transitory computer-readable storage medium according to claim 13, wherein the instructions, when executed by the processor to detect whether the light sensor faces away from a light source, causes the electronic device to:
   acquire by a preset device to acquire a secondary measured brightness of the ambient light, wherein a surface of the electronic device where the preset device is installed faces a direction opposite to another surface of the electronic device where the light sensor is installed and wherein the preset device is another light sensor or a camera;
   compare the measured brightness of the ambient light acquired by the light sensor with the secondary measured brightness of the ambient light acquired by the preset device;
   determine that the light sensor faces the light source if the measured brightness is greater than the secondary measured brightness; and
   determine that the light sensor faces away from the light source if the measured brightness is less than the secondary measured brightness.

\* \* \* \* \*